United States Patent [19]

Jansson

[11] Patent Number: 5,291,926
[45] Date of Patent: Mar. 8, 1994

[54] CUTTING AND SAWING UNIT PROVIDED WITH A TIMBER HANDLING ARRANGEMENT

[76] Inventor: Assar Jansson, Grindvägen 20 A, S-761 62 Norrtälje, Sweden

[21] Appl. No.: 958,303

[22] Filed: Oct. 8, 1992

Related U.S. Application Data

[63] Continuation of Ser. No. 861,973, Jun. 30, 1992, abandoned.

[30] Foreign Application Priority Data

Sep. 17, 1990 [SE] Sweden .................. 9002974

[51] Int. Cl.⁵ .......................................... A01G 23/08
[52] U.S. Cl. ..................... 144/34 R; 83/928; 144/3 D; 144/336
[58] Field of Search ............... 144/2 Z, 3 D, 34 R, 144/34 E, 336; 83/928; 30/379.5

[56] References Cited

U.S. PATENT DOCUMENTS

| | | | |
|---|---|---|---|
| 3,490,350 | 3/1970 | Maradyn | 144/34 R |
| 3,542,099 | 11/1970 | Gibson | 144/34 R |
| 4,083,463 | 4/1978 | Ericsson | 144/34 R |
| 4,412,777 | 11/1983 | Forslund | 144/34 R |
| 4,552,191 | 11/1985 | Kuusilinna | 144/34 R |
| 4,800,936 | 1/1989 | Pomies et al. | 144/34 R |
| 4,881,582 | 11/1989 | Ketonen | 144/34 R |
| 5,082,036 | 1/1992 | Vierikko | 144/34 R |
| 5,101,872 | 4/1992 | Scheuren | 144/34 R |

Primary Examiner—W. Donald Bray
Attorney, Agent, or Firm—Ladas & Parry

[57] ABSTRACT

A cutting and/or sawing unit for timber handling purposes and adapted to be mounted on the free end of a working arm or jib of an off-road vehicle. The unit includes a saw (4) rotatably mounted on a motor stand (1) and knives (6) which project out from a hub part (5) of the saw. The knives are intended to coact with a toothed device (7) on the motor stand (1), to obtain a cutting action in addition to a sawing action. Mounted on the upper side or top plate (11) of the motor stand is a gripping device (2). The motor stand (1) is pivotally suspended on a preferably horizontal shaft (13) journalled in a suspension link (14). This arrangement enables the saw (4) or the griping device (2) to be brought to a working position relative to the surface of the ground, by rotating the motor stand (1).

11 Claims, 4 Drawing Sheets

5,291,926

CUTTING AND SAWING UNIT PROVIDED WITH A TIMBER HANDLING ARRANGEMENT

This is a continuation of copending application(s) International Application PCT/SE91/00606 filed on Sep. 12, 1991 (assigned U.S. Application Ser. No. 07/861,973), now abandoned.

TECHNICAL FIELD

The present invention relates to a cutting and/or sawing unit which is provided with a timber handling arrangement and which is intended to be fitted onto the free end of a working arm or crane arm of an off-road vehicle, and which comprises a rotary sawblade mounted on an engine or motor stand and fitted with knives which project out from a hub part of the rotary blade and which are intended to generate a cutting and/or sawing action, preferably in coaction with a toothed device mounted on the motor stand.

BACKGROUND ART

The aforesaid cutting and/or sawing unit is a development of an earlier, less refined cutting unit of the kind described, for instance, in Swedish Patent Application No. 89103434-2. This known unit is provided with a saw blade which is mounted on a motor stand and fitted with two knives and is intended to rotate in the close proximity of a toothed device, thereby obtaining a cutting action between the knives and the cutting surfaces of the teeth on said device. This unit is able to cut everything from grass and thick-stalk plants to thickets and bushes, shrubs, having stem thickness of up to 5 cm.

However, thicket and bush vegetation which is to be cleaned and cleared will often contain slender threes which must be cut manually with the aid of some type of motor saw. With the intention of eliminating such manual work when cleaning areas of this nature, the number of knives on the saw blade of some cutting units has been increased so as to obtain a sawing action which will enable thicker stems to be cut. However, it is necessary to exercise caution when cutting or felling relatively thick stems, since if the cutting unit is brought against a stem too quickly, the stem is liable to be drawn in towards the center of the saw blade and wedge there between a cutting knife and a cutting tooth, causing the blade to stop abruptly. In order to prevent wood which is too thick to be cut by the unit from being drawn into the cutting unit, there is described in Swedish Patent Application No. 9002286-4 a saw which is equipped with knives whose forward cutting edges are provided with stepped projections. A saw of this construction will not only prevent wood from being drawn into the cutting unit, but also has a lower power consumption than other units while being capable of cutting vegetation of stem thicknesses in the region of 15-20 cm. This extension of the working range of the unit to include trees which can be used in the manufacture of wood chips and wood pulp results in the need of a rational and effective method of recovering the coarser part of the wood when cleaning and thinning vegetation.

DISCLOSURE OF THE INVENTION

The object of the present invention is to enable coarser and thicker vegetation to be handled in a rational and effective manner, preferably when cleaning and thinning vegetated areas. This object is achieved in accordance with the invention with a cutting and/or sawing unit having the characteristic features set forth in the following claims.

BRIEF DESCRIPTION OF THE DRAWINGS

An exemplifying embodiment of a unit constructed in accordance with the invention will now be described in more detail with reference to the accompany drawings, in which FIG. 2 is a sectional view of the unit and link taken along the line II—II in FIG. 1.

BEST MODE OF CARRYING OUT THE INVENTION

Figure 1:
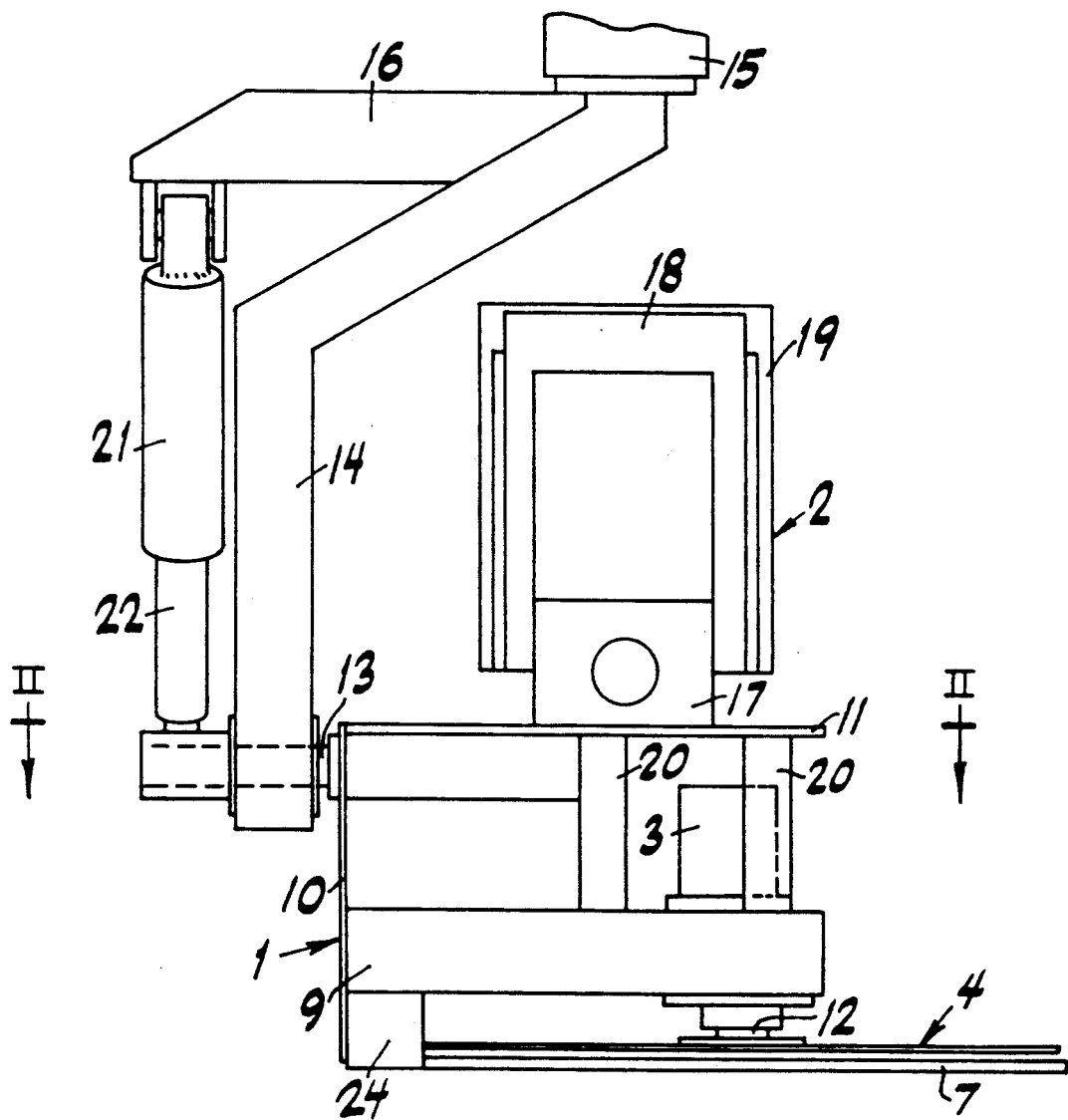
Figure 2:
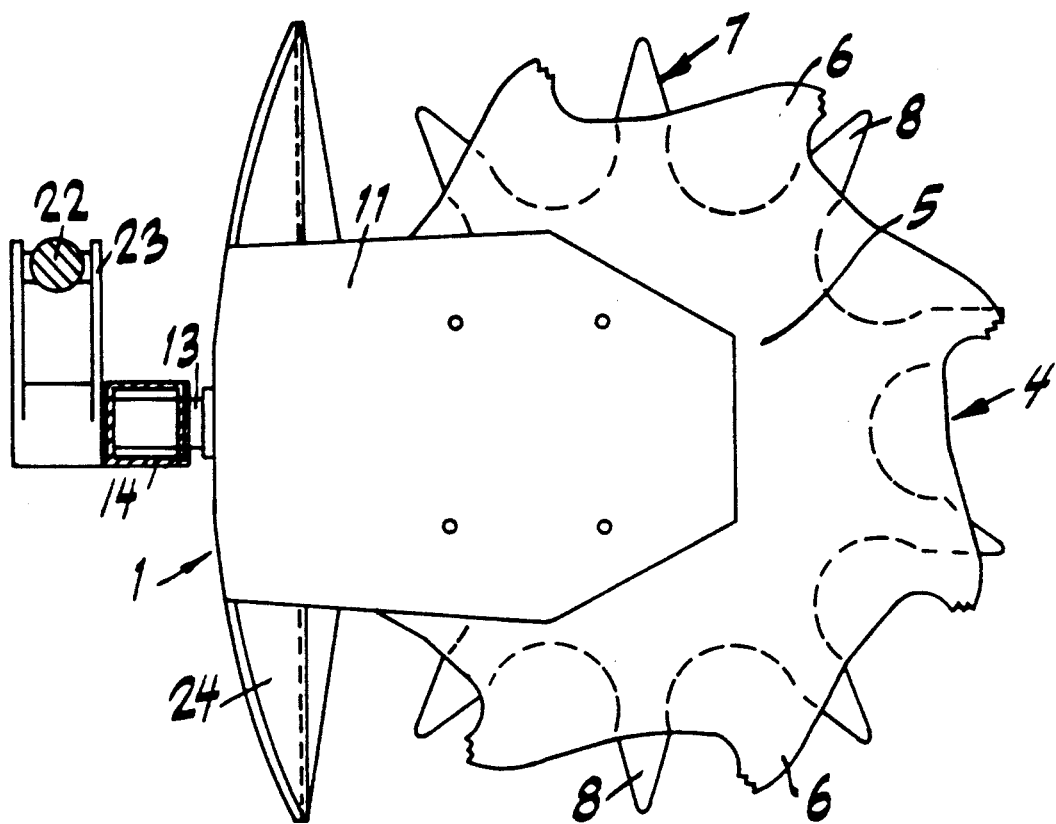
FIG. 2 is a side view of a link-suspended unit.

FIGS. 1 and 2 are respectively a side view and sectioned view of a cutting and sawing unit according to the invention which includes a motor stand 1 comprising a bottom plate (not shown) surrounded by a stiffening frame 9, a top plate 11, a back plate 10 which connects the bottom plate to the top plate 11, and four support legs 20. Mounted in the stand 1 is a hydraulic motor 3 whose shaft 12 carries a saw 4. The saw 4 includes a generally circular hub part 5 from which knives 6 provided with stepped, sawing cutting surfaces project, and is intended to rotate in close proximity to the teeth 8 of a toothed device 7 which extends from a protective bar 24 fitted to the stand 1, thereby obtaining a cutting action in addition to a sawing action. Projecting out from the back plate of the stand 1 is a shaft 13 on which a link 14 is pivotally mounted, said link being connected to a working arm or jib (not shown) mounted on a vehicle through the medium of a rotator 15. Mounted on the top plate 11 of the stand 1 is a hydraulically operated gripper 2 which comprises a foundation 17 and gripping claws 18 and 19.

Figure 3:
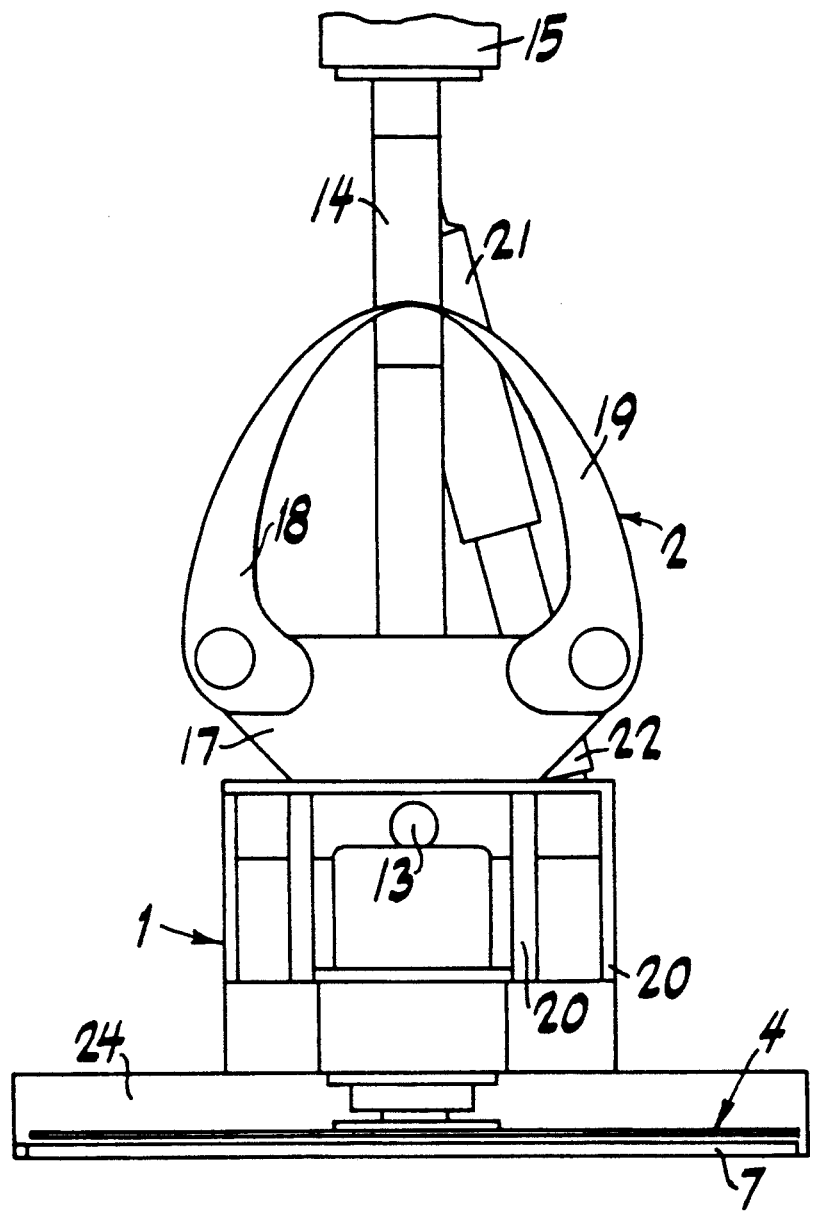
FIG. 3 is a front view of the unit and link.
Figure 4:
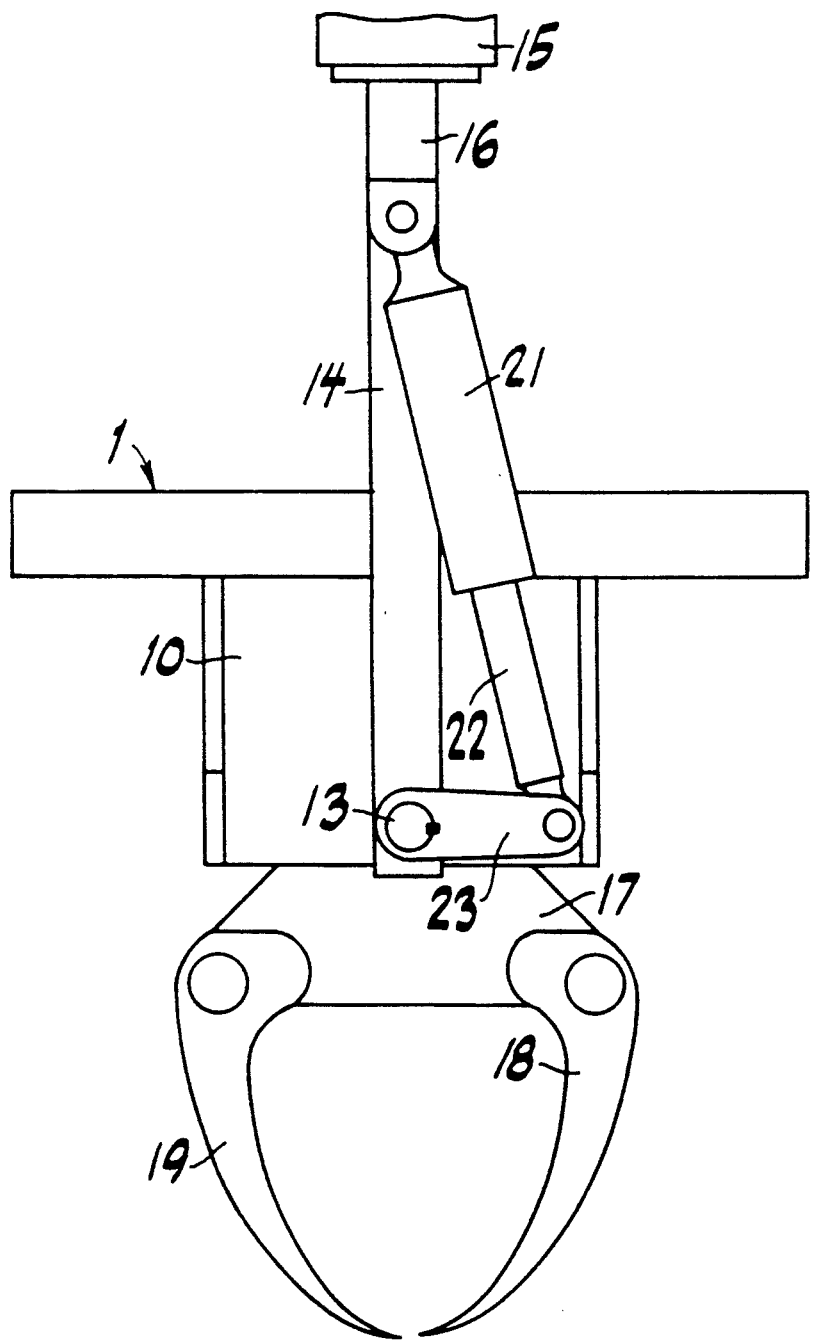
FIG. 4 is a rear view of the unit and link. The requisite line for supplying working fluid to the hydraulic devices and for maneuvering said devices have not been shown in the drawings.

FIGS. 3 and 4 are respective front views and rear views of the unit and illustrate the two working positions to which the unit can be brought by rotating the shaft 13 journalled in the link 14. Thus, the unit can be moved from the cutting position shown in FIG. 3 to the crane position shown in FIG. 4, by means of a double-acting hydraulic piston-cylinder device 21, the piston rod 22 of which is affixed between an arm 16 which extends from the upper part of the link 14 and a lever arm 23 mounted on the suspension shaft 13. During transition from one working position to another, the lever arm 23 is caused to take an upwardly directed, neutral position, by retraction of the piston rod 22 into the cylinder 21. Depending on whether the gripping claws are latched outwardly or are brought together, it is possible to displace the gravitational centre point such as to cause the unit to tip over to either working position, in which the unit is then moved and locked by extending the piston rod 22. If, for some reason or other, the unit will not tip over to the desired working position, the protective bar 24 can be lowered onto the ground and the working arm or jib moved laterally so as to achieve transition to a desired working position.

The aforedescribed extension of the working range of the vegetation cleaning unit, primarily through the provision of new saw types and the present combination of the vegetation cleaning unit with a gripping device, has enabled the work of cleaning and thinning forest vegetation to be rationalized and made considerably more effective. When the inventive vegetation cleaning and timber handling unit is mounted on a logging crane, it is possible to carry out cleaning work alone and, in conjunction with said cleaning work, to rotate the unit to a crane position and to load a forwarder with that part of the felled wood which can be used in the manufacture of wood chips or wood pulp, without moving the forwarder. If the unit is mounted on a tractor or other vehicle which is unable to accommodate such wood, the driver of the vehicle is able to collect or gather suitable wood within the working range of the crane into a single, readily accessible heap which can be later collected by a forwarder or other vehicle, subsequent to completing a vegetation clearing operation and before moving the tractor or other vehicle.

It sill be understood that the described and illustrated unit can be modified within the scope of the inventive concept. For example, the transition from one working position to another may be achieved by a rotator mounted on the link arm 16 adjacent to the end part of the shaft 13.

I claim:

1. The combination of a cutting and sawing unit and a timber handling unit comprising a motor stand, a saw mounted on said motor stand for rotation, a toothed device fixed to said stand in proximity to said saw for producing a sawing and cutting operation therewith upon rotation of said saw, a gripping device mounted on said motor stand, a suspension link, a suspension shaft carrying said motor stand and rotatably supported by said suspension link, and means for rotating said suspension shaft and thereby said motor stand relative to said suspension link between first and second positions in one of which said gripping device is in operative position and said saw and toothed device are in inoperative position, and in the other of which the saw and toothed device are in operative position and the gripping device is in inoperative position.

2. The combination as claimed in claim 1, wherein said gripping device includes opposed gripping claws which face downwardly in the operative position of the gripping device.

3. The combination as claimed in claim 2, wherein said claws of the gripping device face upwardly in the operative position of the saw and toothed device.

4. The combination as claimed in claim 2, wherein said motor stand has upper and lower surfaces, the saw and toothed device being at the lower surface of the motor stand and the tripping device at the upper surface of the motor stand when the saw and toothed device are in operative position whereas the saw and toothed device and the gripping device are reversed when the gripping device is in operative position.

5. The combination as claimed in claim 4, wherein said motor stand rotates through an angle of 180° when moving between said first and second positions.

6. The combination as claimed in claim 5, wherein said saw and toothed device are horizontal and project below said motor stand in said operative position of the saw and toothed device, said griping device then extending upwardly above the motor stand.

7. The combination as claimed in claim 6, wherein said suspension shaft extends horizontally.

8. The combination as claimed in claim 7, comprising means supported on said motor stand for driving said saw in rotation.

9. The combination as claimed in claim 8, wherein said means for rotating said suspension shaft comprises a hydraulic cylinder having extended and retracted positions corresponding to said first and second positions of said motor stand, and a lever arm connecting said hydraulic cylinder and said suspension shaft.

10. The combination as claimed in claim 9, comprising a rotator on an upper end of said suspension link for connection to a vehicle so that the suspension link suspends the motor stand below the rotator.

11. The combination as claimed in claim 9, wherein said saw is rotatable around a vertical axis in the operative position of the saw and toothed device.

* * * * *